Aug. 27, 1940.                J. L. STEWARD                2,212,653
              FREQUENCY CHANGING AND CONTROL APPARATUS
                        Filed Feb. 18, 1939
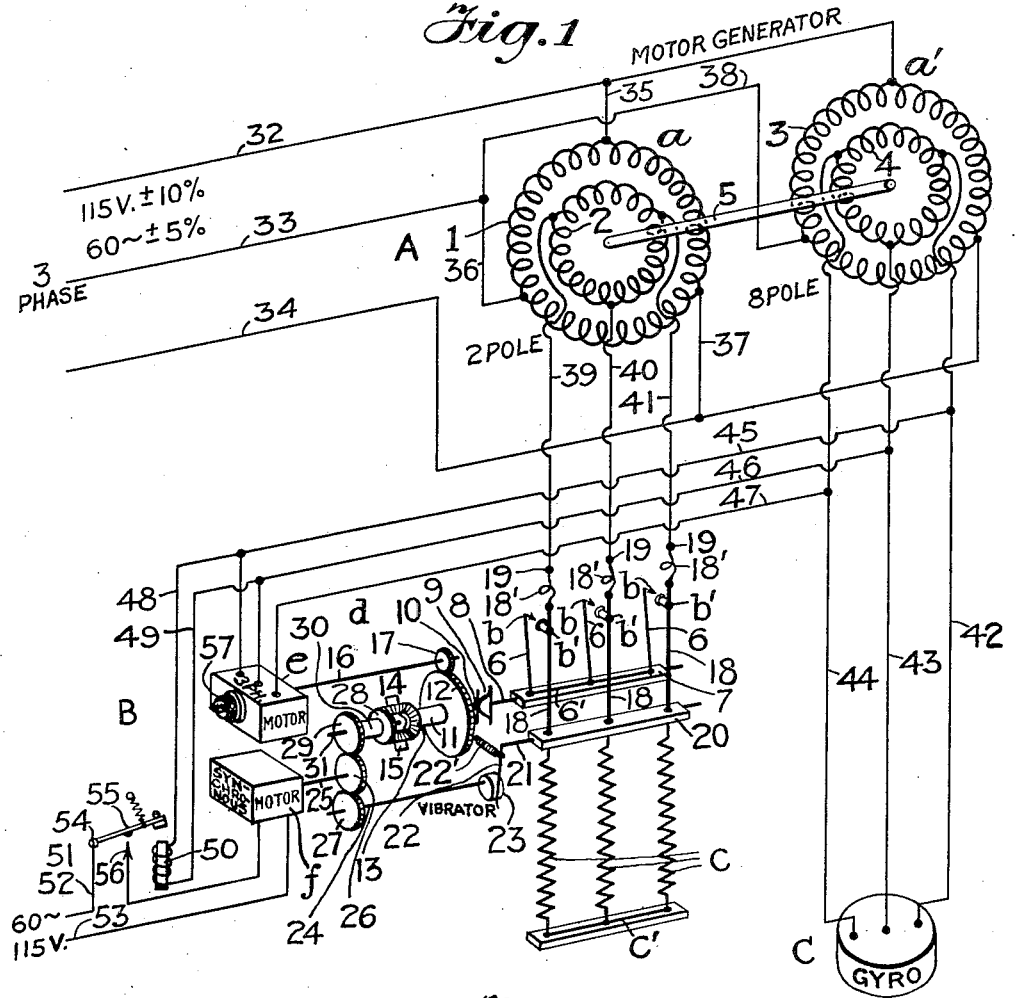
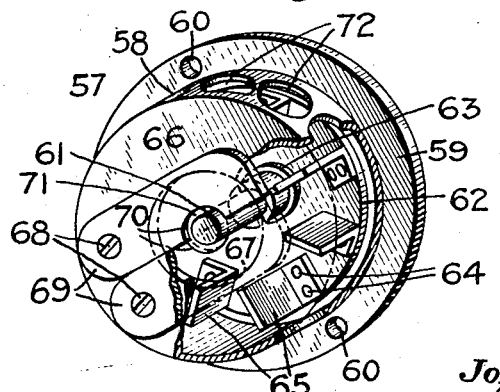
INVENTOR
John L. Steward
BY
ATTORNEY Patented Aug. 27, 1940

2,212,653

UNITED STATES PATENT OFFICE 2,212,653

FREQUENCY CHANGING AND CONTROL APPARATUS

John L. Steward, Flushing, N. Y., assignor to Ford Instrument Company, Inc., Long Island City, N. Y., a corporation of New York Application February 18, 1939, Serial No. 257,213

8 Claims. (Cl. 172—293)

The invention herein disclosed relates to frequency changing and control apparatus and more particularly to an apparatus of this type for utilizing a variable frequency input supply and maintaining the frequency of the output constant.

In the operation of electrical apparatus it is often necessary to utilize current frequencies other than those usually available in the supply lines. In certain apparatus of this type, it is essential for the proper performance thereof, that the frequency of the current supplied should be maintained at a fixed predetermined value. Such an application, for example, is seen in the operation of a gyroscope where high fixed speeds are necessary and higher frequencies are required than those usually furnished by supply lines.

It is an object of this invention to provide apparatus for furnishing constant frequency currents other than those usually furnished by current supply lines.

It is another object of this invention to provide apparatus for maintaining constant frequency currents at higher frequencies than are usually available.

In accordance with the invention these objects together with other objects and certain advantages, which will hereinafter appear, are accomplished by the use of frequency changing apparatus comprising an alternating current motor generator set, having a speed control including two motors for maintaining a constant predetermined frequency output. One of the control motors is operated by and in accordance with the frequency output of the motor generator set and the other is operated in accordance with a fixed frequency current source or other speed controlling means. The speed control of the motor generator set is actuated upon relative difference in angular movements of the control motors and the resulting change of speed effected in the motor generator is proportional to this angular difference in movement. The motor operated by, and in accordance with the frequency of the generator output, has a load so adjusted that the speed characteristics of the motor are the same as that of the load on the generator.

The invention will now be more particularly described by reference to the embodiment illustrated in the drawing, and will be hereinafter pointed out in the claims.

In the accompanying drawing:

Fig. 1 is a diagrammatic illustration of a current frequency changing and control apparatus and mechanism embodying the invention; and Fig. 2 is an enlarged isometric view of the impeller illustrated in Fig. 1 used in connection with one of the control motors.

The apparatus illustrated in Fig. 1 consists of a frequency changer A, control mechanism B and a load represented by a gyroscope C.

The frequency changer A comprises a motor $a$ and a generator $a'$. The motor $a$ has a two-pole stator 1, a wound rotor 2 and the generator $a'$ has an eight-pole stator 3 and a wound rotor 4. The rotors 2 and 4 are connected together by means of a shaft 5.

The control mechanism B consists of two sets of control contacts $b$ and $b'$, a fixed resistance unit $c$, mechanism $d$ and motors $e$ and $f$.

The control contacts $b$ and $b'$ are relatively movable and cooperate in controlling the motor $a$ in a manner which will be described hereinafter.

The contacts $b$ are mounted on the upper ends of arms 6 carried by a rocker arm 7 which is suitably mounted and connected for rotative movement with a shaft 8. The contacts $b$ are electrically connected through the arms 6 and a wire 6' at their lower ends. The shaft 8 is connected by means of a yieldable friction coupling 9 which is well known, to one end of a shaft 10, journaled in a hollow shaft 11, which is integral with a reduction gear 12, and connected to one side 13 of a differential 14. The other end of the shaft 10 is connected to the spider 15 of the differential 14. The reduction gear 12 is driven by the motor $e$ by means of a shaft 16 and gear 17 which meshes with the gear 12. It will be seen that movement of the motor $e$ will be communicated through the spider 15 to the rocker arm 7.

The contacts $b'$ are mounted near the upper ends of arms 18, mounted on a rocker arm 20 which is suitably mounted and connected for movement with one end of a shaft 21. The other end of the shaft 21 is operatively associated, by means of a crank arm 22, with a cam 23 eccentrically mounted on one end of a shaft 24. On rotation of the shaft 24 a vibratory or reciprocating movement is communicated through the cam 23, crank arm 22, shaft 21, to the rocker arm against the tension of a spring 22' which is suitably mounted and connected with the crank arm 23. The contacts $b'$ are suitably connected electrically through the arms 18 to the upper ends of the resistance $c$ the lower ends of which are connected by means of a conductor c'. The upper ends of the arms 18 are connected electrically by flexible leads 18' to binding posts 19 to permit reciprocating movement of the arms. This vibratory movement of the rocker arm 20 is communicated through the arms 18 to the contacts b', which are so positioned relative to the contacts b, that, as shown in Fig. 1, an intermittent making and breaking of the circuit will result. The relative time the contacts are open or closed depends on the position of the arms 6. The arms 6 and 18 are sufficiently flexible to permit this relative oscillatory motion.

The cam 23 is driven by means of the motor f, through a shaft 25, gear 26, gear 27, and the shaft 24. The motor f is also connected to the other side 28 of the differential 14 by means of a gear 29 integral with a hollow shaft 30 and the side 28 of the differential. The hollow shaft 30 is rotatably mounted on a shaft 31 which is an extension of the shaft 10 and connected with the spider 15 of the differential 14. It will be apparent that on movement of both motors e and f, the spider 15 will be a measure of the relative difference in movements of the motors, and that this difference in movement will be communicated, through the rocker arm 7, and arms 6, to the contacts b, tending to open or close the circuit as the case may be. This will cause the resistance c to be shunted in or out of the circuit. As described above, it will also be apparent that the cam 23 will receive rotative movement in accordance with the movement of the motor f, and that the contacts b' will receive vibratory, reciprocatory motion relative to the contacts b.

For the energization of the electrical apparatus illustrated in Fig. 1, a 3-phase supply line is represented by conductors 32, 33 and 34, and while in the embodiment of the invention disclosed, a 60-cycle current is utilized, it will be readily understood that other frequencies may also be used. The frequency of this supply line is subject to variation due to varying conditions of the load. The stator 1 of the motor a is connected to the supply line conductors 32, 33 and 34, by wires 35, 36 and 37 respectively, and the stator 3 of the generator a' is connected directly to two of the supply line conductors 32, 34, respectively, and to the other supply line conductor 33 by a wire 38. The rotor 2 of the motor a is connected to the binding posts 19 by wires 39, 40 and 41.

The rotor 4 of the generator a' is connected to a load represented by the gyroscope C by means of wires 42, 43 and 44, and these wires are connected by means of wires 45, 46 and 47, to the motor e. The wires 45 and 46, representing a single phase of the generator output, are further connected by wires 48 and 49 to a potential relay 50 for the operation of a switch 51, which controls the energization of the motor f. The wires 52 and 53 represent a single phase supply line of a controlled or fixed frequency, which may, as illustrated in the present embodiment, be 60 cycles. The wire 52 is connected through an arm 54, of the switch 51, to one of the switch contacts 55, the other contact 56 thereof is connected to one side of the motor f, and the line wire 53 is connected to the other side of the motor.

The switch 51 is for preventing overloading of the contacts when starting, and operates in conjunction with the relay 50 to hold the motor f out of circuit, or stopped, until the voltage in the output circuit of the generator a' has built up to a predetermined value.

In order to adjust the load of the motor e, so that the speed characteristics thereof may be regulated to equal those of the load operated by the output of the generator a', such as, for example, the gyroscope C, an adjustable means 57 is connected to the motor e, such as an impeller. The impeller 57, as shown more clearly in Fig. 2, consists of a hollow cylindrical casing 58, open at one end, and having a flange 59 equipped with holes 60 for securing the casing to the motor frame, outside of, and concentric with a motor shaft 61. Inside of the casing 58 is a fan disk 62, rotatable with the motor, and having a central sleeve 63 for suitably securing the disk 62 to the shaft 61 of the motor. Secured to and adjacent the outer edge of the disk 62, by means of rivets 64 are centrifugal fan blades or vanes 65. The other end 66 of the casing 58, or the outer end relative to the motor, is closed with the exception of a circular opening 67 surrounding the shaft. Adjustable shutters, or slide valves 69, are pivotally mounted on the end 66 of the casing 58, by means of screws 68, each of the shutters having a semicircular opening 70 and adapted when closed, as shown in Fig. 2, to provide an opening 71 surrounding the shaft 61. The cylinder casing 58 has circumferential circular openings 72 adjacent the vanes 65. Upon rotation of the motor the air inside the casing 58 is ejected through the openings 72 by the vanes due to centrifugal action and creating a suction within the casing. Air is consequently drawn in through the opening 71 surrounding the motor shaft, the amount being proportional to the size of the opening 71. It will be apparent that by changing the relative position of the shutters that the size of the opening 71 may be varied at will and, further, the load on the motor e may be adjusted and the speed characteristics thereof regulated to correspond with those of the gyroscope C.

The apparatus as illustrated and described above is connected and arranged to supply a 3-phase constant frequency output current of 276 cycles from a 3-phase, 60-cycle input subject to variation. This is accomplished briefly as follows: The output frequency of an alternating current motor generator set, per se, such as A, Fig. 1, for example, described hereinabove, with a 60-cycle current, for example, will be 300 cycles, if running at a synchronous speed of 3600 revolutions per minute; this frequency is then reduced to the required frequency by holding down the speed of the rotor 2 of the motor a, in the ratio of 216 to 240, or to a speed of 3240 revolutions per minute.

If the motor a has, for example, fifteen percent slip when the resistance c is in the circuit and five percent slip when this resistance is out of the circuit, then by opening or closing the contacts b and b', the speed of the motor a may be controlled at, say, for example, ten percent slip.

In order that the exact frequency of 276 cycles be obtained, the load of the motor e is regulated, as already described, so that the motor e has the same speed characteristics and slip, say three and four tenths percent, as the load operated by the generator a', or the gyroscope C. The motor e is therefore operated by the frequency output of the generator a', less the three and four tenths percent slip or 16560 less 563 or say 16000 R. P. M., and the motor f is operated at a fixed frequency of 60 cycles or 3600 R. P. M. The motors e and f are coupled together mechanically through the differential 14 by the gears 17 and 12 having a ratio of 3600 to 16000 respectively, or nine to forty. This results in an output frequency of the generator $a'$ of 276 cycles.

The operation of the apparatus is briefly as follows: Upon starting, the motor $f$ is kept out of the circuit by the relay 50; the motor $e$ then operates in a direction to hold the contacts $b$ and $b'$ closed until the gyroscope has come up to sufficient speed to reduce the load on the generator to a point where there will be no longer excessive sparking at the contacts as they open or close. When the voltage of the generator $a'$ has built up to a predetermined value, the relay 50 operates the switch 51 to connect the motor $f$ in circuit. As described above, with both motors $e$ and $f$ in operation, the contacts $b$ and $b'$ operate to control the speed of the motor $a$ by cutting in or out, as the case may be, the resistance $c$. These contacts are operated in accordance with the relative difference in movements produced by the control motors $e$ and $f$. When the speed of the motor $a$ is insufficient to maintain the predetermined frequency output of the generator $a'$, then the motor $f$ will be running faster than the motor $e$ and causing the contacts $b$ and $b'$ to close. Similarly, when the speed of the motor $a$ is too fast to maintain the proper frequency output, the control mechanism operates to open the contacts $b$ and $b'$. The cam 23 continuously imparts a rapid vibratory movement to the contacts $b'$ relative to the contacts $b$, to produce a rapid and intermittent making and breaking of the circuit connecting and disconnecting the resistance $c$ to the rotor 2 of the motor $a$. This prevents surges in the line and acts to smooth out the control. When the frequency in the input supply line varies, the controlled speed of the rotor 2 of the motor $a$ varies inversely to give the desired frequency output of the generator $a'$.

While the embodiment of the invention as illustrated and described has been shown as using a 3-phase, 60-cycle input supply and a predetermined frequency output of the generator $a'$ of 276 cycles, it will be apparent that the scope of the invention includes the use of other frequency current inputs and outputs, likewise other means may be used to maintain the speed of the control motor $f$ constant.

It will be obvious that various changes may be made by those skilled in the art in the details of the embodiment of the invention disclosed in the drawing and described above within the principle and scope of the invention as expressed in the appended claims.

I claim:

1. The combination with an alternating current frequency changer and a motor supplied with current from the changer, of a control means for controlling said changer including a second motor also supplied with current from the changer, and adjustable means for loading said second motor to regulate the speed characteristics thereof to correspond with those of said first motor.

2. Frequency changing and control apparatus comprising an alternating current motor generator set, means operated by the output of the generator, means for controlling the speed of the motor, and means for maintaining a constant output frequency of the generator including a motor operated at a fixed speed, another motor operated by the output of the generator, means operatively associated with the last two mentioned motors and actuated by the relative difference in movements produced thereby for affecting the said control means of the motor generator and adjustable means for loading said generator operated motor to regulate the speed characteristics thereof to correspond with those of said generator operated means.

3. Frequency changing and control apparatus comprising an alternating current motor generator set, a resistance for controlling the speed of the motor, and means for maintaining a constant output frequency of the generator including a motor operated at a fixed speed, another motor operated by the output of the generator and means operatively associated with the last two mentioned motors and actuated by the relative difference in movements produced thereby for cutting in or cutting out the said resistance for controlling the speed of the motor, and means actuated by the fixed speed motor adapted to rapidly cut in and cut out the said resistance for smoothing the action of the speed control.

4. In frequency changing and control apparatus of the type described, the combination comprising an alternating current motor generator set, a resistance connected to the rotor of the motor, and control means for maintaining a constant output frequency of the generator including a motor operated at a predetermined speed, another motor operated by the output of the generator, a differential connecting the two motors and means operated by the output of the differential including relatively cooperating control contacts for effecting relative movement of the contacts for cutting out or cutting in the resistance, and effective to control the speed of the motor, and vibrating means adapted to effect rapid relative movement of said control contacts for smoothing the action of the speed control.

5. In frequency changing and control apparatus of the type described, the combination comprising an alternating current motor generator set, a resistance connected to the rotor of the motor, control means for maintaining a constant output frequency of the generator including a motor operated at a fixed speed, another motor operated by the output of the generator, a differential connecting the two motors and means operated by the output of the differential including relatively cooperating control contacts for effecting relative movement of the contacts for cutting out or cutting in the resistance, and means for smoothing out the said control means and for preventing surges in the line including vibrating means for effecting rapid relative movement of the said contacts.

6. Frequency changing and control apparatus comprising an alternating current motor generator set, means for controlling the speed of the motor, means for maintaining a constant output frequency of the generator including a motor operated at a fixed speed, another motor operated by the output of the generator and means operatively associated with the last two mentioned motors and actuated by the relative difference in movements produced thereby for affecting the said control means of the motor responsive to the output frequency of the generator, and a normally open potential relay switch operated by the generator for controlling the energization of the fixed speed motor.

7. Frequency changing and control apparatus comprising an alternating current motor generator set, a gyroscope operated by the output of the generator, means for controlling the speed of the motor, means for maintaining a constant output frequency of the generator including a motor operated at a fixed speed, another motor operated by the output of the generator, means operatively associated with the last two mentioned motors and actuated by the relative difference in movements produced thereby for affecting the said control means of the motor responsive to the output frequency of the generator and adjustable means for loading said generator operated motor to regulate the speed characteristics thereof to correspond with those of said gyroscope.

8. In frequency changing and control apparatus, the combination comprising an alternating current motor generator set, a resistance for controlling the speed of the motor, means for maintaining a constant output frequency of the generator including a motor operated at a fixed speed, another motor operated by the output of the generator, means actuated by the fixed speed motor for continuously cutting the resistance in and out and differential means actuated by the relative speeds of the fixed speed motor and the motor operated by the output of the generator for varying the relative time the resistance is cut in and cut out.

JOHN L. STEWARD.